June 24, 1930.   E. ROBESON   1,768,002
HEATING DEVICE FOR DRYING MACHINES
Filed Aug. 14, 1929   3 Sheets-Sheet 1

Evans Robeson, INVENTOR
BY Victor J. Evans
ATTORNEY

June 24, 1930. E. ROBESON 1,768,002
HEATING DEVICE FOR DRYING MACHINES
Filed Aug. 14, 1929   3 Sheets-Sheet 2
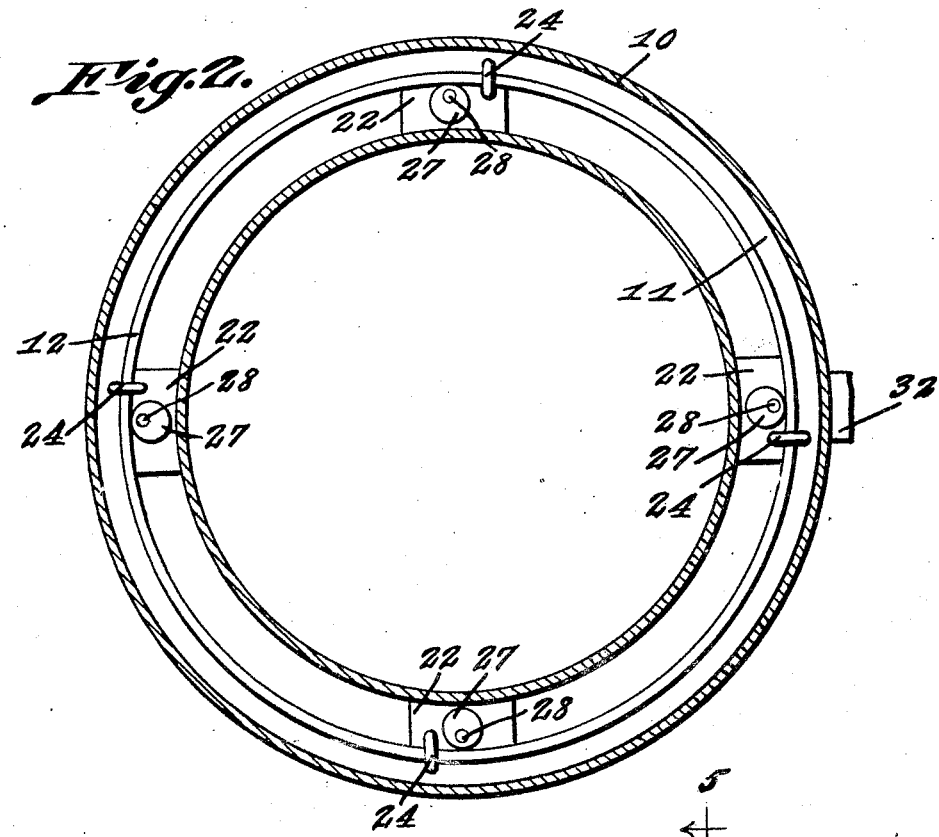
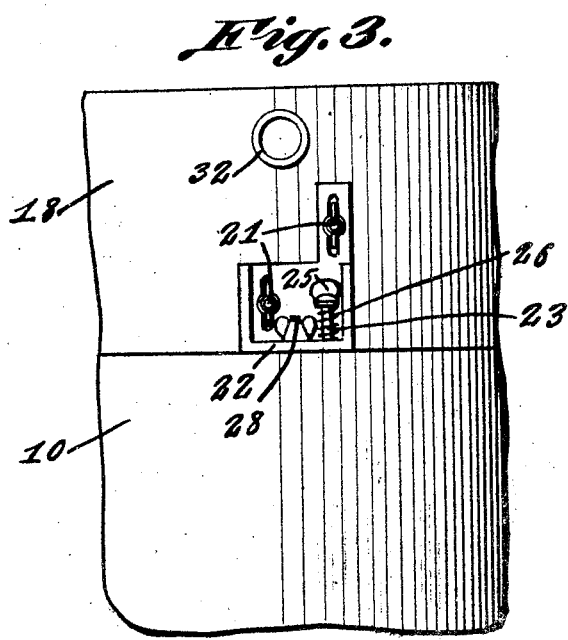
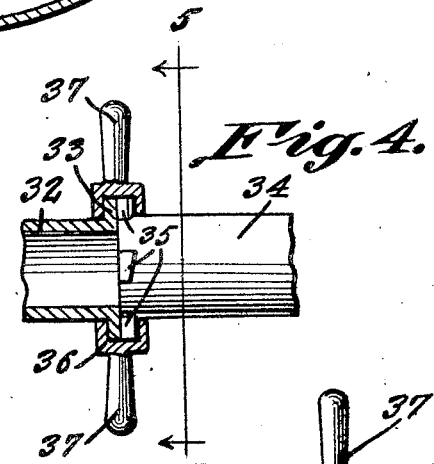
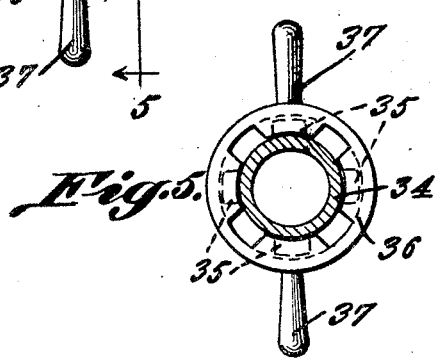
Evans Robeson, INVENTOR
BY Victor J. Evans
ATTORNEY June 24, 1930.  E. ROBESON  1,768,002
HEATING DEVICE FOR DRYING MACHINES
Filed Aug. 14, 1929   3 Sheets-Sheet 3

Evans Robeson, INVENTOR
BY Victor J. Evans
ATTORNEY

Patented June 24, 1930

1,768,002

UNITED STATES PATENT OFFICE

EVANS ROBESON, OF FORT MEADE, FLORIDA

HEATING DEVICE FOR DRYING MACHINES

Application filed August 14, 1929. Serial No. 385,807.

The present invention relates to drying machines of the centrifugal type, and contemplates an attachment therefor designed to direct heat into the machine to facilitate and accelerate the drying operation.

More specifically stated the invention comprehends the provision of a heat deflecting hood adapted to be mounted upon the machine, and arranged to receive and deflect heat into the machine for the purpose above specified.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views, and wherein:—

Figure 2 is a sectional view on line 2—2 of Figure 1.

Figure 3 is a fragmentary side elevation of the machine showing the attachment.

Figure 4 is a detail sectional view showing one form of connection between the hood and the heat supply pipe.

Figure 5 is a sectional view on line 5—5 of Figure 4.

Figure 1:
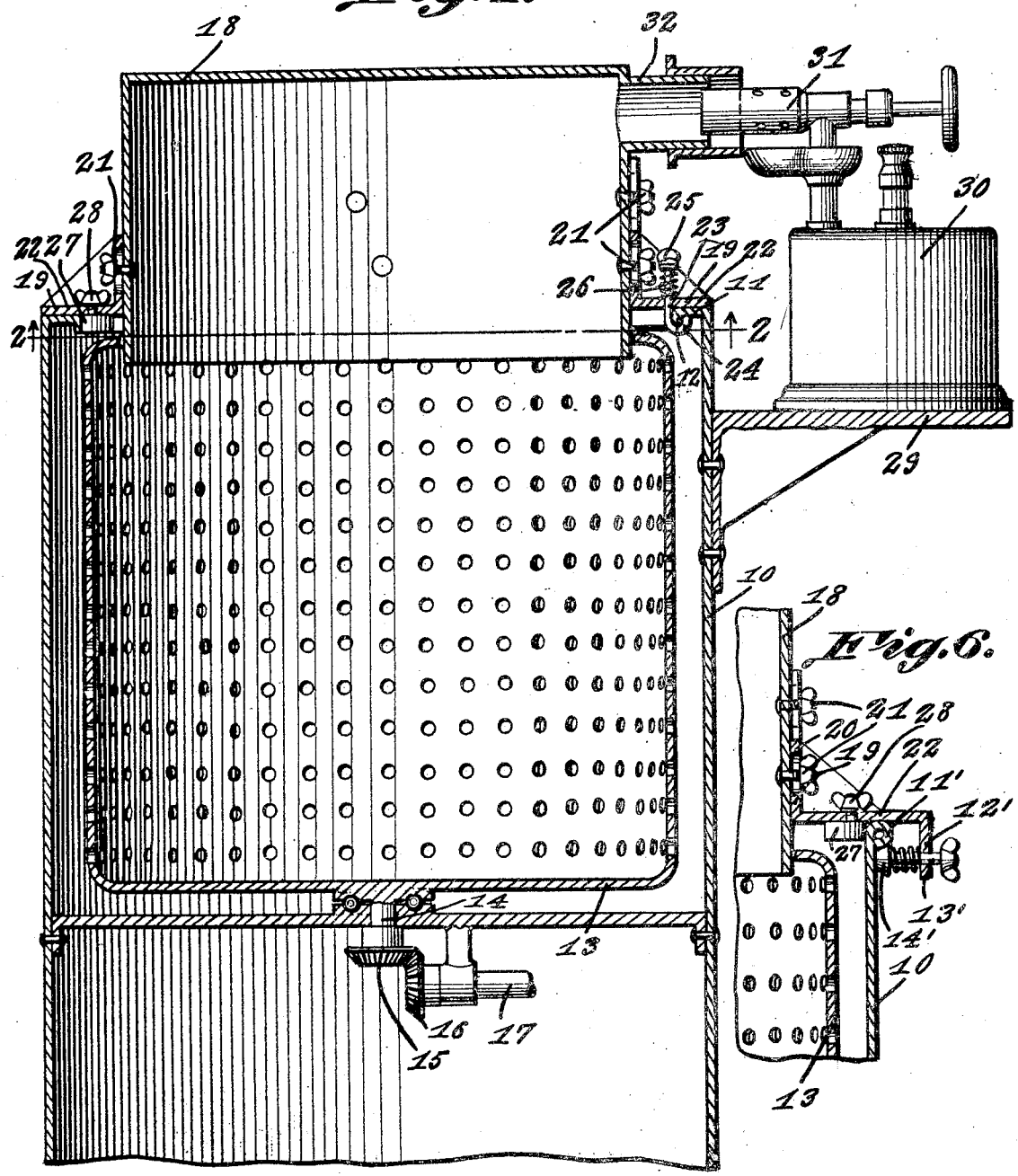
Figure 1 is a fragmentary vertical sectional view through the machine showing the attachment associated therewith.

Referring to the drawings in detail, the drying machine includes an outer casing 10 which may be constructed from any suitable material and also vary in size and configuration without departing from the inventive idea. In the preferred form of the invention illustrated in Figure 1, the casing is preferably formed with an inwardly directed flange 11 and a downwardly extending flange 12 upon which the heat deflecting hood is mounted and supported in a manner to be hereinafter more fully described. Arranged within the casing is a perforated receptacle 13, which is spaced with relation to the walls and bottom of the casing as illustrated, and mounted for rotation. For this purpose the receptacle 13 is provided with a stub shaft journaled in the bottom of the casing 10 and equipped with a bevel gear 15, the latter meshing with a similar gear 16 carried by an operating shaft 17. The shaft 17 may be operated by any suitable means, and is utilized of course to rotate the perforated receptacle 13 within the casing 10. The clothes or other articles to be dried are arranged within the receptacle 13, and when the machine is put into operation, the receptacle is rapidly rotated so that the drying of the contents of the receptacle is effected. The water contained in the clothes is forced through the perforations of the receptacle 13 by centrifugal action as will be readily appreciated.

The attachment forming the subject matter of the present invention comprises a heat deflecting hood 18 which is arranged above the casing 10 partly projecting within the receptacle 13 as clearly illustrated in Figure 1. Various means may be employed for supporting the hood 18 upon the casing 10, but I preferably employ a plurality of substantially L-shaped brackets 19, the vertical branch of each bracket being arranged against the hood and longitudinally slotted to accommodate suitable fastening bolts and nuts indicated generally at 21. Slidable through an opening in the horizontal branch 22 of each bracket is a clamp in the nature of a rod 23, the inner end of which terminates to provide a hook 24 to engage the depending flange 12 of the casing 10, while interposed between the head 25 of the fastener and the horizontal branch of the bracket is a coil spring 26, which of course, exerts an upward pressure against the fastening element to hold it engaged with the depending flange 12 of the casing. Also carried by each horizontal branch 22 of each bracket is an eccentric or cam 27, these elements being arranged beneath the brackets to engage the flanges 12 of the casing, each eccentric being carried or supported by a bolt 28 so that the eccentrics can be actuated to effect a lateral adjustment of the hood and properly center the same with relation to the machine. In accordance with the preferred embodiment of the invention as illustrated in Figure 1, the casing 10 has supported thereon a suitable bracket 29, while reposing upon this bracket is the fuel container 30 for a suitable burner indicated at 31. The burner 31 partly projects within a tubular extension 32 projecting laterally from the hood 18, but spaced from the burner so that air may be drawn into the hood through the space, incident to the creation of the partial vacuum within the latter during the rotation of the receptacle 13. Manifestly, the heated air introduced into the hood 18 through the extension 32 circulates around the hood and is deflected into the perforated receptacle 13, and thereby materially accelerates the drying operation as will be readily appreciated.

Other types of heating devices may be used in conjunction with the hood 18, and I have illustrated in Figures 4 and 5 a means for coupling a heat supply pipe with the extension 32 of the hood. For this purpose, the extension 32 is formed with an annular flange 33, while the heat supply pipe 34 is formed with spaced tapered lugs 35. A flanged ring 36 is adapted to surround the flange 33 and is constructed to engage the lugs 35 of the heat supply pipe 34, and when the ring 36 is turned in one direction the parts are held fixed relatively. The ring is provided with manipulating handles 37.

Figure 6:
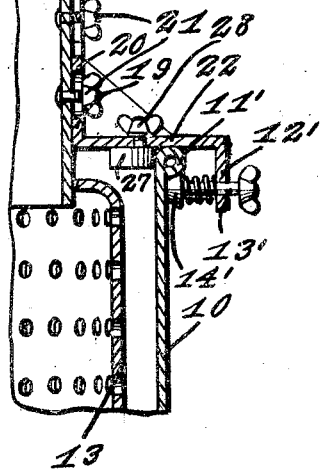
Figure 6 is a fragmentary sectional view of a modified construction of means for associating the hood with the machine.

In Figure 6 I have illustrated a slightly modified form of the invention, wherein the outer casing 10 has its upper edge rolled to form a bead 11', in contradistinction to the flanges 11 and 12 illustrated and described in connection with the preferred form of the invention. The hood 18 is provided with the angle or brackets of the character hereinabove described, although the horizontal branch 22 of each bracket projects beyond the casing 10 and terminates to provide a depending flange 12' which supports a spring influenced fastening element 13' as illustrated in Figure 6. The head 14' of this element is adapted to engage beneath the bead 11' of the casing 10 in order to hold the hood properly supported thereon.

Figure 7:
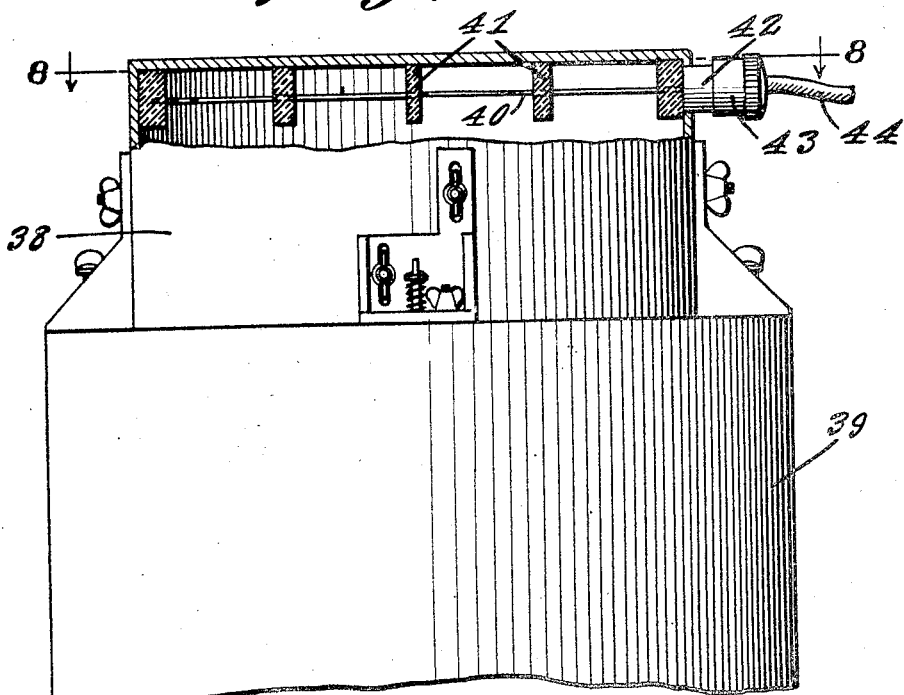
Figure 7 is a fragmentary view partly in section of a further modified form of the invention.
Figure 8:
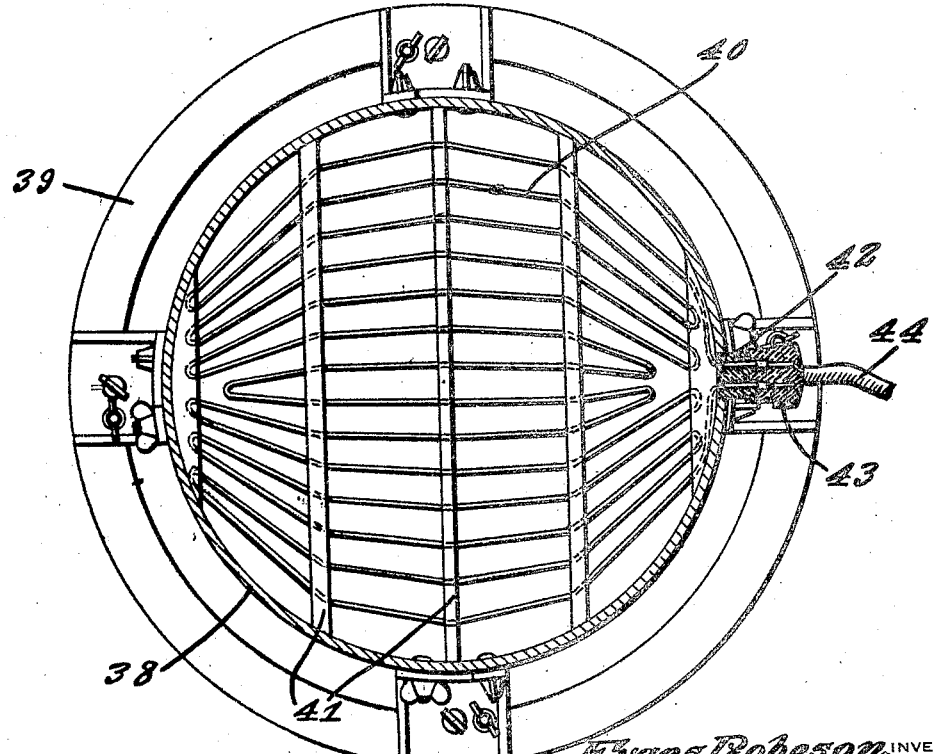
Figure 8 is a sectional view on line 8—8 of Figure 7.

In Figures 7 and 8 I have illustrated another modified form of the invention, wherein the heat deflecting hood is of substantially the same construction as hereinabove described and is mounted and supported upon the casing 39 as described in connection with the preferred embodiment of the invention. However, in this form of the invention, the heat deflecting hood 38 is provided with an electrical heating element 40, which is supported within the hood by spaced parallel strips 41 of insulating material. The heating element has, of course, associated therewith a plug 42 which projects through an opening in one side of the hood, and is adapted to accommodate a suitable socket 43 carried by the end of the electric wire 44.

Irrespective of what form of the invention is employed or the manner of supplying the hood 18 with heat, the principle of operation is exactly the same, in that heat received by the hood 18 is deflected thereby into the perforated receptacle 13, while the latter is being rotated in the manner above described. Consequently the heat introduced into the receptacle 13 materially aids in the quick drying of the contents contained within the receptacle.

While it is believed that from the foregoing description the nature and advantages of the invention will be readily apparent, I desire to have it understood that I do not limit myself to what is herein illustrated and described, and that such changes may be resorted to when desired as fall within the scope of what is claimed.

What I claim is:—

1. A heating device of the character described, comprising in combination with a casing open at its upper end, of a hood partly received by the open end of the casing, and having an open bottom communicating with the casing, means for supplying the hood with heat, means carried by the hood for adjusting the latter laterally with a view of centering the hood with relation to the casing, and means carried by the hood for detachably connecting the same with the casing.

2. A heating device of the character described comprising in combination with a casing open at its upper end, of a hood partly received by the casing through its open end, brackets adjustably supported by the hood, means carried by the brackets for detachably connecting the hood with the casing, and means carried by the bracket for adjusting the hood laterally and centering the hood with relation to the casing, and means for supplying the hood with heat.

3. A heating device of the character described comprising in combination with a casing open at its upper end, of a hood partly received by the casing through the open end thereof, and having an open bottom communicating with the casing, means for supplying the hood with heat, brackets vertically adjustable upon the hood and constructed to repose upon the adjacent edge of the casing, spring-influenced means carried by the brackets for detachably connecting the hood with the casing, and means carried by the brackets for centering the hood with relation to the casing.

4. A heating device of the character described comprising in combination with a casing open at its upper end, of a hood partly received by the casing and having an open bottom communicating with the latter, means for supplying the hood with heat, vertically adjustable brackets carried by the hood and reposing upon the adjacent end of the casing, and spring-influenced means carried by the brackets for detachably connecting the hood with the casing.

5. A heating device of the character described comprising in combination with a casing open at its upper end, of a hood partly received by the casing and having an open bottom communicating with the latter, vertically adjustable brackets carried by the hood and reposing upon the adjacent end of the casing, spring-influenced means carried by the brackets for detachably connecting the hood with the casing, eccentrics carried by the brackets and utilized to center the hood with relation to the casing, and means for supplying the hood with heat.

In testimony whereof I affix my signature.

EVANS ROBESON.